US006237138B1

(12) United States Patent
Hameluck et al.

(10) Patent No.: US 6,237,138 B1
(45) Date of Patent: May 22, 2001

(54) BUFFERED SCREEN CAPTURING SOFTWARE TOOL FOR USABILITY TESTING OF COMPUTER APPLICATIONS

(75) Inventors: Don E. Hameluck, Newmarket; Vince V. Velocci, Scarborough, both of (CA)

(73) Assignee: International Business Machines Corp., Armonk, NY (US)

( * ) Notice: Subject to any disclaimer, the term of this patent is extended or adjusted under 35 U.S.C. 154(b) by 0 days.

(21) Appl. No.: 08/968,985

(22) Filed: Nov. 12, 1997

(30) Foreign Application Priority Data

Nov. 12, 1996 (CA) ................................................ 2190043

(51) Int. Cl.[7] ........................................................ G06F 9/45
(52) U.S. Cl. ............................................. 717/4; 702/182
(58) Field of Search ............................. 395/704, 500.43; 714/37, 46; 607/27; 345/329, 302, 326, 334; 717/4; 703/22; 702/57, 182

(56) References Cited

U.S. PATENT DOCUMENTS

| | | | |
|---|---|---|---|
| 4,696,003 | * 9/1987 | Kerr et al. ........................ | 714/38 |
| 4,773,003 | * 9/1988 | Hauge ............................. | 714/46 |
| 5,022,028 | * 6/1991 | Edmonds et al. ................ | 714/38 |
| 5,153,886 | * 10/1992 | Tuttle ............................ | 714/38 |
| 5,157,779 | * 10/1992 | Washburn et al. ............... | 714/37 |
| 5,220,658 | * 6/1993 | Kerr et al. ...................... | 703/22 |
| 5,333,302 | * 7/1994 | Hensley et al. ................. | 714/37 |
| 5,335,342 | * 8/1994 | Pope et al. ..................... | 714/38 |
| 5,349,662 | * 9/1994 | Johnson et al. ................. | 717/4 |
| 5,450,534 | * 9/1995 | Spohrer et al. ................. | 345/334 |
| 5,487,754 | * 1/1996 | Snell et al. ..................... | 607/27 |
| 5,566,295 | * 10/1996 | Cypher et al. .................. | 345/326 |
| 5,652,714 | * 7/1997 | Peterson et al. ................ | 702/57 |
| 5,721,845 | * 2/1998 | James et al. ..................... | 345/326 |
| 5,801,687 | * 9/1998 | Peterson et al. ................. | 345/302 |
| 5,844,553 | * 12/1998 | Hao et al. ........................ | 345/329 |

OTHER PUBLICATIONS

Milutinovic–Shriver, Automated regression testing of graphical user interface based applications, System Sciences, 1991. Proceedings of the Twenty–Fourth Annual Hawaii International Conference, p. 101 vol. 2, Jan. 1991.*
Hartson–Castillo–Kelso, Remote Evaluation: The Network as an extension of the Usability Laboratory, CHI 96, Jan. 1996.*
Spool–Snyder–Robinson, Smarter Usability Testing: Practical Techniques for Developing Products, CHI 96, Apr. 1996.*
Sullivan, The Windows 95 User Interface: A Case Study in Usability Engineering, Microsoft Corporation, Jan. 1995.*
Rowley, Usability Testing in the Field: Bringing the Laboratory to the User, CHI 94, Apr. 1994.*

* cited by examiner

Primary Examiner—Mark R. Powell
Assistant Examiner—Hoang-Vu Antony Nguyen-Ba
(74) Attorney, Agent, or Firm—Jerry W. Herndon; Marcia L. Doubet

(57) ABSTRACT

Present methods available to user centered design practitioners for gathering information pertaining to end-user usability of computer applications have proven be expensive, labour intensive, time consuming and somewhat ineffective. A usability software tool is described which results in relatively simple and effective feedback of end-users reactions to the use of software applications. A critical event is identified by the user and the screen activity for a period of time prior to the critical event is captured. A file of these screen-clips as well as textual information entered by the end-user is provided to the design practitioner for review and analysis.

12 Claims, 3 Drawing Sheets

FIG. 4

Product Strength

What task/component were you working on.

```
Edit-Compile
Debugging
Browsing
Profiles
```

Describe what you liked:

[ OK ]  [ Cancel ]

FIG. 6

UCDCam Browser

Name: A. Inventor
Company: IBM
Product: Development Tool

Events

| S | 0 | Comment | General |
|---|---|---------|---------|
|   | 0 | Comment | General |
|   | 1 | Question | Browsing |
|   | 1 | Question | Edit-Compile |
|   | 2 | Minor | Edit-Compile |
|   | 2 | Minor | Debugging |

Comment

There are too many options available here. Most people would only ever use the first three. The rest just make the dialog more confusing.

Annotate

Play

Event filter

☒ Strengths
☒ Weaknesses

Tasks to show: All tasks

Show ratings greater than: 0-Comment

[ Done ]

BUFFERED SCREEN CAPTURING SOFTWARE TOOL FOR USABILITY TESTING OF COMPUTER APPLICATIONS

FIELD OF THE INVENTION

This invention broadly relates to computer methods, systems and computer program products for usability testing of computer software applications. The invention more particularly relates to methods, systems and software for the retrospective capturing of screen displays for evaluation of applications, including graphical user interfaces, during the use of the applications. The invention extends to remotely capturing of such screen displays and also user comments so as to test, amongst other aspects, the usability of applications remotely.

BACKGROUND OF THE INVENTION

It is common and indisputable that most users of computing systems encounter various sorts of problems while using software products. Designing computer software that will minimize user problems requires a knowledge of the user and the task that is trying to be accomplished. The design process typically includes iterative design and user testing of those designs in order to identify where users have problems so that design flaws can be accurately addressed and fixed. A thorough knowledge of problems that users encounter in existing products is also critical if design mistakes are to be avoided for future versions of those products. It may also be advantageous to a particular software design and manufacturing company to capitalize on the design flaws of products of its competitors thereby providing the opportunity for a competitive advantage in product usability.

Currently, user testing methods to gather information regarding usability problems with software applications for analysis by user centred design practitioners or experts fall typically into three categories.

The first pertains to field testing where a trained usability tester is deployed in a customer site to observe users doing real work in making use of computer applications. Typically the usability tester would keep notes of critical incidents or potential usability problems that are observed while the users perform their work. Obvious problems with this method of gathering product data is that it is labour and resource intensive, limited to a small sample of user tasks and it is intrusive in the sense that an outside party is observing work being done within a customer location. This method is seldom used in practise.

A common method of gathering information is laboratory evaluations. Typically, users are recruited and brought into a usability lab probably located at the site of the software designer. Users are then requested to perform a series of prescribed tasks and the trained usability testers note the users problems while using the software (i.e. critical incidents) and manually record a description of the problem. With mutual consent, the sessions could be video taped so that the specific interaction with the application product can be replayed for detailed analysis by the usability tester at a later time. The problems with this method of gathering product information are that it is labour intensive, expensive and difficult to set up, the subjects must be recruited, it is time consuming collecting the data and the data obtained is often limited in that the tasks; situation and environment are somewhat artificially limited and specifically prescribed.

Another commonly used method for obtaining usability information is through beta testing where an early version of a software product is made available to a number of beta evaluation participants. This method is currently used by most software design and manufacturing companies. Feedback on the products is gathered from the users in conference calls or surveys. Users can also identify specific problems to the manufacturer in electronic forums. The shortcomings with this method are that the responsibility for problem identification and reporting is left primarily to the users and that the manufacturer must rely on users to document all problems encountered including the inability of users to articulate some specific problems.

Thus, in general, the labour costs of using traditional usability evaluation methods (including recruiting, setup costs, running evaluation sessions, recording and analyzing data) to record critical incidents and determine usability problems means that testing is expensive and only minimal testing can be carried out within practical time and costs constraints. The scope of real-life user-work that is actually covered in association with the particular application is quite limited with methods that require a usability expert or professional to be present. It has been found that typically when the professional is not present during the actual evaluation session, the number of critical incidents that are reported from the users in the field are only a very small proportion of all those major and minor problems that are actually encountered by users.

It is also recognized that the users who are employed in the above described evaluation sessions are not trained as usability experts or professionals, nor would the software design and manufacturing company want this to be the case. As a result, the users often blame themselves that the application won't work, they have trouble articulating and documenting problems they encounter, they do not remember every problem they encounter or they simply do not want to identify problems. Thus any process for the collection of evaluation data pertaining to a particular application must minimize the impact of the above shortcomings and provide simple and convenient mean of indicating critical events by the users and simple and convenient means of returning product related data for analysis. It of course is desirable that the information returned be useful and identifies all major user problems and can identify a high percentage of existing problems quickly, contain a low percentage of false problems and that the information can readily be used for program design enhancement.

A number of prior art references and documentation that generally relate to known evaluation tools and product data gathering information have been identified.

U.S. Pat. No. 5,457,694 which issued Oct. 10, 1995 to Dale J. Smith, entitled "Method and Apparatus for Analyzing the ATA (IDE) Interface", relates to a bus analyzer or analyzing and trouble shooting the ATA bus used commonly in personal computers to interface to hard disk drives. The analyzer records the events occurring on a computer system and provides easily understandable yet detailed description of those events to a technician for the purpose of diagnosing a computer system related problem or for measuring system performance. The analyzer described is portable, simple to operate and capable of transferring recorded data to almost any computer through a particular serial port. The analyzer has a memory system which stores recorded signals or events and a trigger circuit to select the starting and stopping point of the recording. The data being recorded are digital signals from the system and the events being captured are digital system performance related and are presented to a specialist via a display.

IBM Technical Disclosure Bulletin, Vol. 38, No. Feb. 2, 1995, Pgs, 377–375, entitled "User Documentation Tool Update Facility", describes a tool that can be used by a software developer to create on-line help user guides. The user documentation is generated by recording how users perform application tasks and after the application is changed, the recorded tasks are replayed to verify or check for application changes. The tool records snap shots of application screens as an application familiar user demonstrates how to perform typical tasks. The user can directly control which snap shots are saved and which are not. The images captured are discreet static screen capture and provides the ability to record and replay a user's interaction with an application.

The publication of H. R. Hartson et al entitled "Remote Evaluation: The Network as an Extension of the Useability Elaboratory", Proceedings of the CHI '96, Computer Human Interaction Conference, Apr. 13–18, 1996 describes a comparison of the results obtained from users of applications in a usability lab to the user results obtained remotely via a computer network. Because of the documented shortcomings in traditional user interface evaluation methods for remote usability, evaluations are considered wherein the evaluation performing observation and analysis is separated in space and/or time from the user. The results of case studies are presented including remote evaluation using video teleconferencing where all the users actions are transported as video data in real time so that the observer can evaluate user interfaces in remote locations as they are being used. Another method consists of semi-instrumented remote evaluation which is based on critical incident gathering by the user within the normal work context of the user. The semi-instrumented approach has potential for cost effectiveness since the user and the system gather the data and evaluators look only at data that relate to usability problems.

SUMMARY OF THE INVENTION

It is therefore an object of the invention to provide methods, systems and computer program products for end users to conveniently, inexpensively and accurately identify design problems in computer software applications which impact the usability of the applications.

A further object of the invention is to provide a method and system for remotely and retrospectively capturing usability data in order to detect and identify design problems in user interfaces of software.

A further object of the invention is to provide methods, apparatus and software capable of identifying more "real world" usability problems with computer software than can be identified with traditional methods.

A further object of the invention is to provide a method, apparatus, and software to collect effective user data for computer software with minimal effort or initiative on the part of the usability practitioner or expert and also that the data collected is relevant, ecologically valid and context captured as required.

A further object of the invention is to provide a method and apparatus which will result in effective usability assessments of software application products and that this can be achieved remotely for the usability expert and that feedback can be readily obtained from the end user.

A further object of the invention is to provide for a method and its implementation with software products or parts thereof so that usability data can be provided to the designer, and/or evaluator of the software with a minimum of impact on the user.

A further object of the invention is to provide a method and apparatus for collecting usability data that functions as a real-time video recorder for all on-going activity that appears on a computer monitor when a user is working with an application.

According to one aspect of the invention, there is provided a method for capturing application testing data while a user is working with at least one computer application in which the computer application or applications is or are operating on a computing system wherein the computing system includes a display screen and a user input device comprising the steps of recording screen activity resulting from the use of the application or applications by the user, identifying at least one critical event by the user input device, capturing a record of the screen activity which is recorded for a period of time prior to the identification of the critical event and discarding the record of the screen activity which occurred prior to said period of time.

According to another aspect of the invention, there is provided in a computer system for capturing reactions of a user while the user is making use of at least one computer application running on a computer system, the computer system including a display screen, a user input device, means for recording screen activity (depicting use of the one) or more applications by the user, means in response to activation of the user input device for identifying at least one critical incident of activity occurring on the display screen, means for saving the screen activity occurring for a period of time prior to the identification of the critical incident and means for discarding the record of the screen activity which occurred prior to said period of time.

According to a further aspect of the invention there is provided a computer program product comprising; a computer usable medium having computer readable program code means embodied therein for causing feedback data as to the usability of at least one computer program application running on a computer to be provided comprising; computer readable program code means for causing the computer to effect recording of screen activity resulting from the use of said computer program application by the user; computer readable program code for causing the computer to identify a critical event of said computer program application in response to a user input; computer readable program code for causing the computer to capture a record of said recorded screen activity for a period of time prior to the identification of said critical event; and computer readable program code for causing the computer to discard the record of the screen activity which occurred prior to said period of time.

BRIEF DESCRIPTION OF THE DRAWINGS

The foregoing and other objects, aspects and advantages of the invention will be better understood from the following detailed description of a preferred embodiment of the invention, which is an application usability testing tool referred to herein for convenience as UCDCam, with reference to the accompanying drawings which illustrate aspects of the software tool and in which:

FIG. 4 depicts a product strength dialogue window;

FIG. 6 shows a browser window according to the embodiment; and

DETAILED DESCRIPTION OF THE PREFERRED EMBODIMENT

Figures 1, 2, 3:
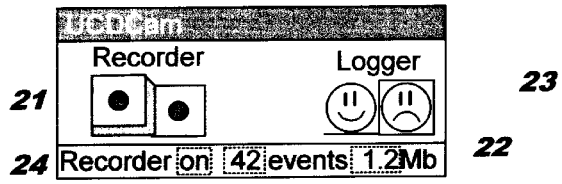
FIG. 1 is a registration dialogue window according to the prefer embodiment of the invention.
FIG. 2 is an event recorder window.
FIG. 3 depicts a product weakness dialogue window.

The preferred embodiment of the invention consists of a software usability tool which has been developed and which is referred to as UCDCam. The software tool functions as a real-time video recorder for all ongoing activity that appears on a computer monitor. While the tool is running on the computer system along with any one or more applications being evaluated, it is continually recording ongoing screen activity of any software application in which the end user is working.

If the end-user likes or does not like an aspect of any software application which is being used, has a question or a problem with the application, the end user simply uses the computer mouse pointer to activate the tool and the screen activity for a period of time proceeding the activation of the tool (this is referred to as a critical event) is saved to a file. The critical event or critical incident is a situation that compels an end-user to activate the tool. A window opens which allows the end user to enter a description comment indicating what component of the application they were using or what task they were doing at the time of the critical event and to also rate the severity of the problem. The comments provided by the end-user are textual descriptions of the critical incident. The period of time for which the screen displays are retrospectively captured is variable and can depend upon the intent of the usability expert or the end user himself. If the user has not pressed the event button to activate the tool in a certain time interval, the preceding screen activity is discarded. Upon receipt of the comments files and the corresponding screen-clip files, the user centred design practitioner can play back each clip to understand the various strengths and weakness of the product or application that is being evaluated and reported on by the end-user. The term end-user refers to a person who is doing some sort of work on a computer system and, on experiencing a critical incident activates the tools as will be more fully described.

The UCDCam tool consists of two sections or applets. One is referred to as the Recorder for collecting the information from the end user and the other is referred to as the Browser which is used by the expert practitioner to browse and analyze the information received from the end user. The term practitioner is a person who configures the UCDCam tool for a specific purpose and who views the screen-clips and comment data that the tool gathers from the end-user.

The recorder applet will in general record and cache all screen activity leading up to a user initiated critical event. The recorder component of UCDCam floats on the end-user's desktop and provides the end-user with control for starting/stopping a screen-recorder buffer for logging critical events. It caches an average of two minutes of activity although this can be variably defined. When the end user signals a critical event as a product "strength" or "weakness", the recording is paused and the user can describe what was liked or disliked with the product. When this is complete, the cached screen recording is stored to a disk as a screen-clip and the user comments are appended to a log file. Thus the screen-clip is a file that contains information required to replay the screen activity from an end-user computer display up to the point where a critical event occurred and the log file stores the user's comments, ratings and annotating.

The first time the recorder is launched, the end user is prompted to identify himself, the product being evaluated and also to select a disk drive which is to be used to store the correct screen-clips and the log file. It is apparent that it may be advantageous in product evaluation situations to include the recorder embodiment with beta versions of products which are selectively provided to customers. In this way, customers reactions to products can be received effectively and almost automatically.

It is also apparent that the recording tool does not have to be used locally in a laboratory environment but could be employed at a remote workstation. Known products that can be readily used to implement the capturing or recording means for the screen-clips include the following: IBM Distributed Console Access Facility (DCAF), KopyKat from Hilgraeve Inc., look @ me from Farallon Computing Inc., or ScreenCam from Lotus Development Corporation.

Through whatever mechanism is desired, the log file and screen-clip files are gathered and sent to the user centered practitioner expert for consideration and analysis. The Browser is an application used to read the log files and display their contents. It is a facility that allows the usability expert or practitioner to manage and play-back the recorded screen-clips and record of user information. The Browser lists all events along with the comments that were made by the end user. A provision may also be included that allows the practitioner to annotate the screen-clips with comments and additional textual information about the event.

With reference to FIG. 1 of the drawings, when the application usability tool, or in this case specifically the UCDCam tool is evoked, a registration dialogue generally referred to by the numeral 15 appears on the screen and is used to collect identifying information indicated generally by 16, from the end user. This information is saved in a log file and is used to identify the individual who submitted the specific screen-clip when the practitioner plays it back. The registration dialogue 15 allows the end user to direct the saved screen-clips to an appropriate location for recording, for example, one that has the most available space, such as various storage drives 17. The end user then presses the OK button 18 when the registration dialogue has been completed.

Upon completion of the registration process, the event recorder window, generally referred to as 20 in FIG. 2, is evoked by the computer and appears on the screen Window 20 is a small window that floats on top of all other windows on the screen desktop. Window 20 allows the end user to turn the screen-clip recorder ON and OFF by toggle switch 21 and also to signal a critical event (buttons 22, 23) to the UCDCam tool. When the recorder toggle switch 21 is set to ON the computer and UCDCam tool actively records ongoing screen activity to a screen-clip file that can be replayed at a later time. If the recorder button 21 is toggled "OFF" the UCDCam tool does not result in the recording of ongoing screen activity.

If the end user presses the "happy face" push button 22 thus indicating that the end user has just used or become aware of a feature of the software application under test that he is particularly satisfied with, the tool causes the computer to open a product strength window 40 for input by the user as will subsequently be described with reference to FIG. 4. If the user presses the "sad face", push button 23 in FIG. 2 to indicate a feature of the product that the end user is particularly dissatisfied with or has a comment about question or problem in doing a particular task, the product weakness window 30 as will be subsequently described in conjunction with FIG. 3, is opened by the computer for user input.

The practitioner can readily configure whether or not the logger function is available when the recorder 21 is off. If the UCDCam tool has been configured such that the recorder 21 must be "on" in order for logger functions to be available to the end user, the "happy face" 22 and "sad face" 23 event push buttons will be grayed-out and will not function if the recorder is "off". A status line 24 indicates the number of screen-clips that have been saved on the end users computer and the amount of space that the clips and other data files occupy.

As has been previously indicated, product weakness dialogue window 30, in FIG. 3, appears on the screen when the end user has pressed the "sad face" button 23 in event recorder window 20. With reference to FIG. 3 of the drawings, the window 30 contains a list box 31 that allows the end user to select which task or product component he was working on when he pressed the event button. The individual items listed in this list box 3 1 are configured by the practitioner before the UCDCam tool is provided to end users for their input. Window 30 also contains a list box 32 that allows the end user to rate the severity of the weakness being reported. The individual items listed in list box 32 are also configured by the practitioner before the UCDCam tool is provided to end users. A multi line edit field 33 allows the end user to type or input their comments, questions, problems or dislikes regarding the product or applications that they are evaluating into the computer. Once the input to window 30 is complete, the end user clicks on OK button 34 in a well known manner in order to have the information saved in a log file.

As had been previously alluded to, a product strength dialogue window 40 is caused to appear on the screen when the end user has pressed the "happy face" button 22 on the event recorder window 20. With reference to FIG. 4, the window 40 contains a list box 41 that allows the end user to select which task or product component he was working on when he pressed the event button as previously described with reference to FIG. 2. The individual items listed in list box 41 are configured by the practitioner before the UCDCam tool is provided to end users. It is appropriate to have the same items appear in list box 41 as appeared in list box 31 so as to facilitate the practitioner to be able to more readily correlate the strengths and weaknesses of the product or application under evaluation.

A multi line edit field 42 allows the end user to enter or type comments, or positive aspects regarding the products that they are evaluating. In a similar manner as with respect to what was described for product weakness dialogue 30, OK button 43 is pressed by the end user when all input has been made in order to have information recorded in a log file.

Figure 5:
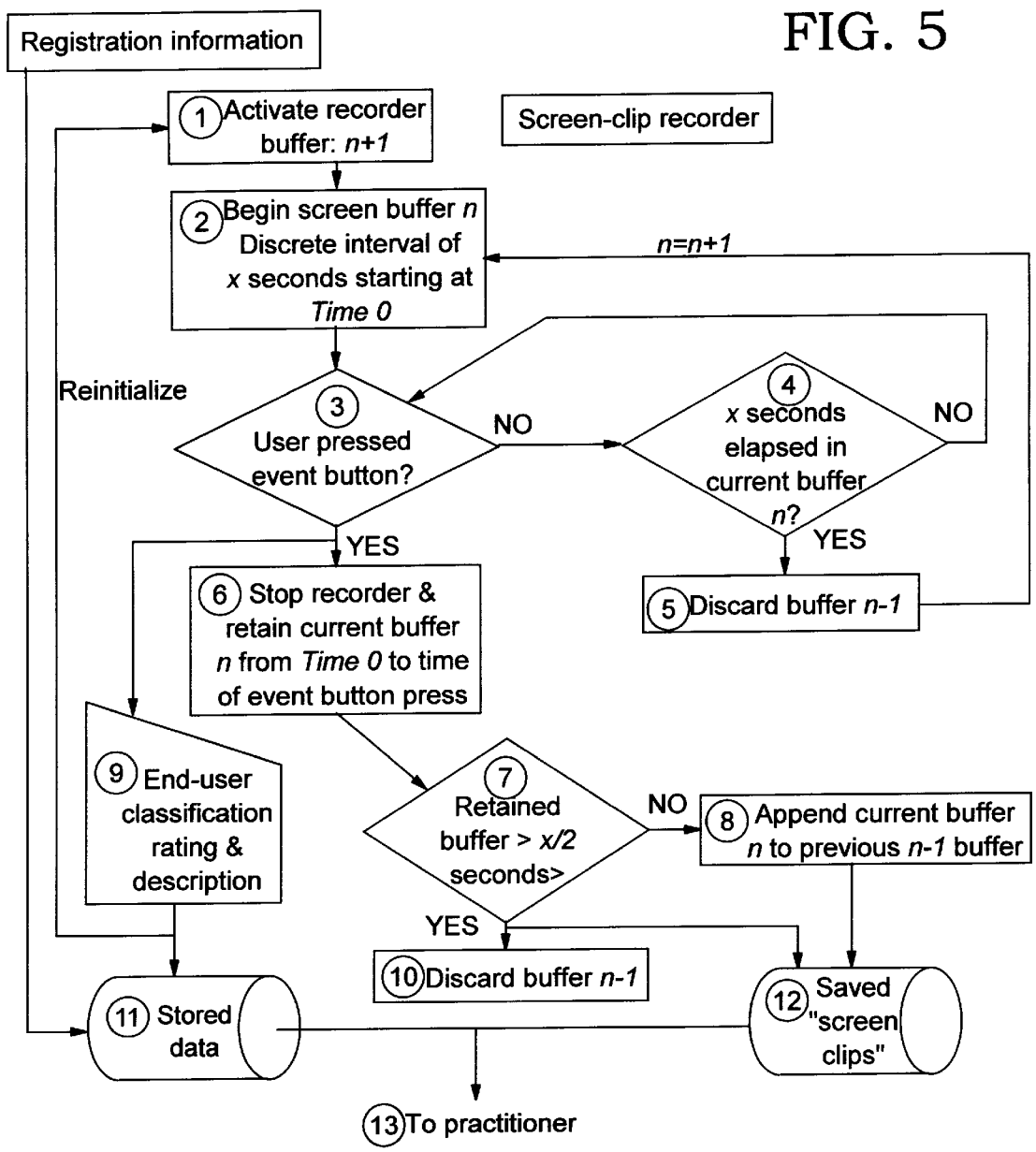
FIG. 5 is a flowchart illustrating the screen-recorder operation of the preferred embodiment of the invention.

FIG. 5 shows a flowchart of the screen-clip recorder feature operation that is implemented by the programmed computer. The element, registration information, is the information obtained from the registration dialogue window as has been described in conjunction with FIG. 2 and is stored in a log file as shown as storage device 11. When the recorder button 21 of the event recorder window 20 is turned "on" the screen-clip recorder is activated as shown in element 1 of the flow chart. The first screen recording buffer n=1 of X seconds duration is started as shown at 2. When the screen buffer n reaches a duration of X seconds without the end user having pressed an event button 22 or 23 as shown in FIG. 2, prior to X seconds elapsing as shown at 3 and 4, the previous buffer n–1 is discarded (if it exists) as shown at 5. If the user presses an event button 22 or 23 on recorder 20, the screen recording buffer is stopped, as shown at 3 and 6. If this occurs prior to X seconds having elapsed in the current screen recording buffer n, then the current screen recording buffer will be retained from when it was started (time 0) up to the moment that the event button 22 or 23 was pressed. If that time is less than half of the configured clip duration time, i.e. X/2, then the currently retained buffer n is appended to the end of the previously retained buffer n–1 (as shown at 8) and this information is saved in a file as shown at storage device 12. Otherwise, if the current buffer n is longer than X/2, then buffer n–1 is discarded as shown at 10 and only buffer n is saved in file 12. The screen recorder is then automatically reinitialized and restarted after the end user's comment and the screen recording buffer have been saved to storage devices 11 and 12 respectively. It should be recognized that the above description is for a preferred embodiment and the length of time for the retrospective capturing of screen displays can be readily varied.

As has been previously described, when the end user presses an event button 22 or 23 as the case may be, the appropriate dialogue 40 or 30 ("strength" or "weakness") is displayed and the end user selects the appropriate values and enters his comments in the multi line entry field as shown at 9. When the OK button is pressed in either of dialogue windows 30 or 40, the information is saved to a file as shown at storage device 11. and the screen recorder is restarted and at the same time reinitialized. This information also contains pointers that relate the end users event ratings and comments as previously described for FIGS. 3 and 4, to their related screen-clips storage device 12. The saved screen-clips 12 and log files of the stored data 11 are then forwarded to the practitioner as shown at 13 in an appropriate manner for his consideration.

As has been mentioned above, the evaluation tool Browser is used by the practitioner to view the screen-clips and the related ratings and comments as submitted by the end user. The Browser is an application that can read the log files and display their contents.

With reference to FIG. 6 the browser window is shown generally by reference 60. Browser 60 will list all the events along with the comments that were made by the end users. Each event that exists in the screen-clip database 12 is listed in the events list box 62. The task or component description and severity rating for each event are listed in the list box 62 and further indications could readily be provided as to whether the event was a "strength" (happy face event button) or "weakness" (sad face event button). In this embodiment only an "s" for strength event has been identified. The specific end user comment associated with the currently selected event is displayed in the comment read only multi line edit field 63, an example of which is shown. Information identifying the end user who made the currently selected comment and the application being evaluated is displayed at 61. The practitioner can enter comments or additional textual information into the Annotate multi line entry field 64. If annotations already exist they will be displayed in this field also. Practitioner annotations are saved in a file in order for them to be related to the appropriate screen-clips and comments logged by end users and to provide for future review by either the same or other practitioners. As may be convenient, the events in the screen-clip database that are displayed in the events list box 62 may be restricted to only show selected application data, for example: 1) strengths and/or weaknesses, 2) certain tasks or product components or 3) a specific range of severity ratings. Any of these or other options may be readily implemented.

When the practitioner presses the play push button 65 on browser 60, the normal computer desktop view is replaced with the end user's screen as it appeared at the beginning of the screen-clip and the full screen-clip begins to play in real time on the screen. This allows the practitioner to play the screen-clip associated with a comment.

Figure 7:
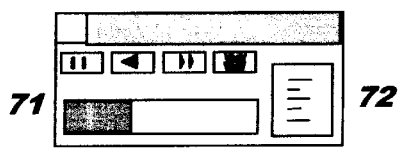
FIG. 7 shows a playback control window.

In referring to FIG. 7, a small playback control window 70 floats on the screen-clip replay which provides control for the practitioner during playback. Playback control 70 allows the playback of the screen-clip to be paused, rewound, fast forwarded, or exited as shown by the various icons 71. The screen-clip can also be annotated by the practitioner while viewing the screen-clip.

Playback control 70 provides for a number of graphical user interface push buttons 71 that behave as follows:

Pause—Stop replaying the end user's screen-clip in real time and leave its current state as a static screen. The clip can be started from this intermediary point by pressing the button again.

Rewind—Stop replaying the end user's screen-clip and pause it at the beginning.

Fast-forward—Accelerate replay of the screen-clip.

Stop-Replay—Stop replaying the end user screen-clip and return the screen display back to the practitioners computer desktop and the browser window 60.

Annotate button 72 is provided which when pressed by the practitioner causes playback of the screen-clip to be paused and the annotate window providing an input field (not shown) is displayed for input by the practitioner. The annotate window could be moved and floats or top of the screen-clip desktop. Playback is resumed when the practitioner closes the annotate window 72 by pressing OK.

When the screen-clip is playing, a small indicator-gauge in playback control 70 displays the relative amount of time that has played. When playing the gauge line is green and when paused the line is red.

It is considered that the implementation of the various applications, windows and the flowchart as illustrated and described in this description are well within the skill of a competent programmer and can be readily implemented in any appropriate computer programming language for any operating system for the proper operation and functioning of a computer system. Any appropriate system with a user interface such as an IBM Personal Computer System could be used to implement the invention.

The term software application as used in the specification, is not limited to one having a graphical user interface (GUI). A graphical user interface is where an end-user interacts with a computer using graphical information windows and a mouse input device. Indeed any application having a user-interface can have screen-clips recorded. All that is needed is that the application at least displays information that an end-user can see on a computer display.

While the invention has been presented in the context of the usability tool, it is contemplated that the inventive concepts are broader than this and can meaningfully be used in a range of evaluation applications including verification, component testing, application testing, write-in recommendations etc. or any user-centered design approach of products. This approach of product design emphasizes the importance of involving people who will actually make use of products in the design of those products.

It should be readily understood that the foregoing description is only illustrative of the invention. Various alternatives and modifications may be devised by those skilled in the art without departing from the invention. Accordingly, the present invention is intended to embrace all such alternatives, modifications and variations which fall within the scope of the appended claims.

The embodiments of the invention in which an exclusive property or privilege claimed are defined as follows:

1. A method for capturing application testing data while a user is working with at least one computer application in which the at least one computer application is operating on a computing system wherein the computing system includes a display screen and a user input device, the method comprising the steps of:

continuously recording a record of screen activity resulting from use of the at least one application by the user in a device accessible to the computing system by overwriting an oldest record;

using the user input device to identify a critical event of the at least one application;

capturing a record of the recorded screen activity for a period of time prior to the identification of the critical event;

opening a window on the display screen in response to the identification of the critical event, the window enabling the user to enter information pertaining to the critical event and the at least one application; and saving a record of the information entered by the user.

2. The method as set forth in claim 1, wherein a duration of the period of time is variable and selectable by the user.

3. The method of claim 1, further comprising the step of discarding the record of the screen activity which occurred prior to the period of time.

4. A computer system for capturing reactions of a user during use of at least one application running on the computer system, the computer system comprising:

a display screen;

a user input device;

means for continuously recording screen activity depicting use of an application by the user by overwriting old recorded screen activity;

means in response to an activation of the user input device for identifying a critical event of activity occurring during the use of the application;

means for saving the screen activity occurring for a period of time prior to the identification of the critical event;

means for opening a window on the display screen in response to the identification of the critical event for the user to input information pertaining to the critical event and the at least one application; and means for saving a record of the user input information.

5. The computer system as set forth in claim 4, further comprising:

means to vary a duration of the period of time for which the screen activity is saved.

6. The computer system as set forth in claim 4, further comprising:

browser means for subsequently receiving and displaying the saved screen activity and the user input information.

7. The computer system of claim 4, further comprising means for discarding the record of the screen activity occurring prior to the period of time.

8. A computer program product comprising:

a computer usable medium having computer readable program code means embodied therein for causing feedback data to be provided as to usability of at least one computer program application running on a computer, the computer readable program code means comprising:

computer readable program code means for causing the computer to effect continuous recording of screen activity resulting from use of the computer program application by a user by overwriting old recorded activity;

computer readable program code means for causing the computer to identify a critical event of the computer program application in response to a user input;

computer readable program code means for causing the computer to capture a record of the recorded screen activity for a period of time prior to the identification of the critical event;

computer readable program code means for causing the computer to enable the user to enter information pertaining to the critical event and the computer program application in response to the identification of the critical event; and computer readable program code means for causing the computer to save a record of the information entered by the user.

9. The computer program product of claim 8, further comprising computer readable program code means for causing the computer to discard the record of the screen activity which occurred prior to the period of time.

10. A method for capturing application testing data while a user is working with at least one application in which the at least one application is operating on a computing system wherein the computing system includes a display screen and a user input device, the method comprising the steps of:

recording screen activity resulting from use of the at least one application by the user;

using the user input device to identify a critical event of the at least one application;

opening a window on the display screen in response to the identification of the critical event for the user to enter information pertaining to the critical event and the at least one application;

saving a record of the information entered by the user;

capturing a record of the recorded screen activity for a period of time prior to the identification of the critical event; and discarding the record of the screen activity which occurred prior to the period of time, wherein the critical event is an aspect of the at least one application which the user found to be a strength or weakness of the at least one application.

11. A method for capturing application testing data while a user is working with at least one application in which the at least one application is operating on a computing system wherein the computing system includes a display screen and a user input device, the method comprising the steps of:

recording screen activity resulting from use of the at least one application by the user;

using the user input device to identify a critical event of the at least one application;

opening a window on the display screen in response to the identification of the critical event for the user to enter information pertaining to the critical event and the at least one application;

saving a record of the information entered by the user;

capturing a record of the recorded screen activity for a period of time prior to the identification of the critical event; and discarding the record of the screen activity which occurred prior to the period of time;

wherein the application testing data captured is usability data and more than one application is operating on the computing system.

12. A computer program product comprising:

a computer usable medium having computer readable program code means embodied therein for causing feedback data to be provided as to usability of at least one computer program application running on a computer comprising:

computer readable program code means for causing the computer to effect recording of screen activity resulting from use of the computer program application by a user;

computer readable program code means for causing the computer to identify a critical event of the computer program application in response to a user input;

computer readable program code means for causing the computer to capture a record of the recorded screen activity for a period of time prior to the identification of the critical event;

computer readable program code means for causing the computer to discard the record of the screen activity which occurred prior to the period of time;

computer readable program code means for causing the computer to enable the user to enter information pertaining to the critical event and the computer program application in response to the identification of the critical event; and computer readable program code means for causing the computer to save a record of the information entered by the user;

wherein the computer program product forms a part of the computer program application or of a different computer program application.

* * * * *